United States Patent
Aoyagi et al.

(10) Patent No.: US 7,584,379 B2
(45) Date of Patent: Sep. 1, 2009

(54) MOBILE TERMINAL AND SOFTWARE UPDATE METHOD

(75) Inventors: Katsumi Aoyagi, Tokyo (JP); Tomohiro Ichikawa, Tokyo (JP); Yoshinori Motoyama, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 395 days.

(21) Appl. No.: 11/669,974

(22) Filed: Feb. 1, 2007

(65) Prior Publication Data

US 2007/0226334 A1  Sep. 27, 2007

(30) Foreign Application Priority Data

Feb. 17, 2006 (JP) ............................ 2006-040359

(51) Int. Cl.
*G06F 11/00* (2006.01)
(52) U.S. Cl. ...................................... 714/15
(58) Field of Classification Search ................. 714/2–7, 714/13, 15, 16, 18, 20, 30, 31, 38, 42, 43
See application file for complete search history.

(56) References Cited

U.S. PATENT DOCUMENTS

| | | | |
|---|---|---|---|
| 7,047,448 B2 * | 5/2006 | Rao et al. ...................... | 714/38 |
| 7,082,549 B2 * | 7/2006 | Rao et al. ...................... | 714/6 |
| 7,516,451 B2 * | 4/2009 | Peng ........................... | 717/173 |
| 2004/0218488 A1 * | 11/2004 | Hwang et al. ............. | 369/44.32 |
| 2005/0010576 A1 * | 1/2005 | Ren et al. .................... | 707/100 |
| 2005/0071839 A1 * | 3/2005 | Kim et al. ................... | 717/170 |
| 2006/0069755 A1 * | 3/2006 | Peng ........................... | 709/220 |
| 2006/0077941 A1 * | 4/2006 | Alagappan et al. .......... | 370/338 |
| 2007/0050678 A1 * | 3/2007 | Estes et al. .................... | 714/38 |
| 2008/0141239 A1 * | 6/2008 | Larsson et al. .............. | 717/173 |

* cited by examiner

*Primary Examiner*—Nadeem Iqbal
(74) *Attorney, Agent, or Firm*—Oblon, Spivak, McClelland, Maier & Neustadt, P.C.

(57) ABSTRACT

A mobile terminal having a communication function. The apparatus includes: a nonvolatile memory including a memory area storing a main-unit program including an update engine for updating software and an alternative unit area for a unit area in the memory area; a working memory; and control means for accessing both of the memories. The control means downloads differential data between a version of the main-unit program and a version of a new main-unit program, expands the update engine into the working memory area, executes the update engine, updates the main-unit program for each unit area by the differential data, completes the update processing if the update has been successful, and performs the unit-area update processing on the alternative unit area and replaces the defective unit area by the alternative unit area if a defect of a unit area has been detected at the time of the update.

4 Claims, 8 Drawing Sheets

MOBILE TERMINAL AND SOFTWARE UPDATE METHOD

CROSS REFERENCES TO RELATED APPLICATIONS

The present invention contains subject matter related to Japanese Patent Application JP 2006-040359 filed in the Japanese Patent Office on Feb. 17, 2006, the entire contents of which are incorporated herein by reference.

BACKGROUND OF THE INVENTION

1. Field of the Invention

The present invention relates to a mobile terminal having a communication function, and to a method of updating the software thereof.

2. Description of the Related Art

Currently, cellular phones, which are a kind of mobile terminals, have various functions, such as telephone calls, electronic mails, the Web browsing, personal information management, memorandums, taking a picture with a camera, etc., and are carried around by many users. Also, some types of cellular phones having a function of receiving a radio and television broadcast, a function of playing back music, etc., have become available recently.

Regardless of the number of such functions, all cellular phones are controlled by computer programs (software in a broad sense). Such a computer program is stored in a memory contained in a cellular phone.

In general, version upgrades are carried out for software in order to fix defects called bugs, to add functions, and to make improvements.

Upgrading software for an electronic apparatus is normally carried out by installing necessary software from a medium recording a new software version in the electronic apparatus, or by replacing an internal ROM. However, it is not possible to ask the user to perform such an operation, because there are so many cellular phone users having no knowledge of computers.

Accordingly, the models having a function of rewriting the software of a cellular phone using OTA (Over The Air) capability is on the market in these days. "OTA" means the communication by radio using a communication function of a cellular phone. Thus, it is possible to update software without imposing a special burden on users, dealers, etc. Specifically, the rewriting of the software is carried out by downloading the differential file between the version-up software and the main-unit program of the cellular phone, and by updating only the difference of the software of the cellular-phone main unit.

To date, there have been various problems with the implementation of a software update function. For example, after software update processing is started, the main-unit program is rewritten. Thus, if the update processing has been successful, the cellular phone functions as a new version. However, if the update processing has failed, it becomes difficult even to turn on the power to the cellular phone. That is to say, if the update processing has failed because of a defect of a memory device or a failure in writing, it become difficult for the main-unit program to be restored. In order for the main-unit program to be restored, it is necessary to execute loading the software through a known serial cable. Thus, it becomes difficult for a general user to execute the processing.

In an electronic apparatus controlling the operations thereof by firmware, the following technique has been proposed (Japanese Unexamined Patent Application Publication No. 2005-235110). In the technique, when the program is updated by the update data of the firmware received through an external connection interface, in order to immediately restore a destroyed or lost program at the time of the update processing failure back to a state capable of using the original functions, the program object to be updated is saved in an external server. After the update processing is performed, if the processing has failed, the saved object before the update is received from the external server to be written back into the ROM.

SUMMARY OF THE INVENTION

In the technique described above, when the update has failed, the electronic apparatus goes into a state in which there is no normal program in the terminal temporarily until the program saved before is written back from the external server. This state is not acceptable for a terminal such as a cellular phone.

In view of such a problem, in a prior application (Japanese Patent Application JP 2006-3873), the present applicant has proposed a method in which two memory areas are provided for storing programs as a restoration measure when the software update has failed, and if the program in one of the areas becomes unavailable because of the failure in the software update, the program is restored by starting the program in the other of the areas. However, in this method, the memory capacity becomes twice the original capacity, and thus the cost of the apparatus increases.

Under these circumstances, the present invention addresses the above-identified problem, and provides a mobile terminal and a method of updating the software thereof, which allows to perform the update processing with a relatively small memory capacity and without saving the software in the external apparatus, and in which the use of the terminal is not restricted for a long time.

According to an embodiment of the present invention, there is provided a mobile terminal having a communication function, including: a nonvolatile memory including a memory area storing a main-unit program including an update engine for updating software and an alternative unit area for a unit area in the memory area; a working memory; and control means for accessing the nonvolatile memory and the working memory, wherein the control means downloads differential data between a version of the main-unit program and a version of a new main-unit program, expands the update engine of the memory area into the working memory area, executes the update engine in the working memory area, performs update processing of the main-unit program for each unit area by the differential data, completes the update processing if the update has been successful, and performs the unit-area update processing on the alternative unit area and replaces the defective unit area by the alternative unit area if a defect of a unit area has been detected at the time of the update.

Thus, even if a defect is detected in the area to be updated in the nonvolatile memory at the time of updating the software, the update processing is normally completed by using the alternative unit area.

Also, even if the physical address of a specific unit area is changed, the operation of the mobile terminal after the update is normally performed by using address-conversion means for converting an address of the defect-detected unit area into an address of the alternative unit area.

According to an embodiment of the present invention, there is provided a method of updating software of a mobile terminal having a communication function, the method including the steps of: disposing a memory area storing a main-unit program including an update engine for updating software and an alternative unit area for a unit area in the memory area in a nonvolatile memory; downloading differential data between a version of one of the main-unit program and a version of a new main-unit program; expanding the update engine of the memory area into a working memory area; performing update processing of the main-unit program for each unit area by the differential data by executing the update engine in the working memory area; completing the update processing if the update has been successful; and performing the unit-area update processing on the alternative unit area and replaces the defective unit area by the alternative unit area if a defect of a unit area has been detected at the time of the update.

In the present invention, an alternative unit area for a unit area in the memory area which stores a main-unit program to be updated is provided, and the alternative unit area is used when a defect is detected at the time of updating software. Thus, a restoration function at the time of failing in the software update is realized while necessary memory capacity is kept at a minimum. This brings about an effect of preventing the use of the terminal from being restricted for a long time at the time of updating the software.

DESCRIPTION OF THE PREFERRED EMBODIMENTS

In the following, a detailed description will be given of a preferred embodiment of the present invention with reference to the drawings. Here, a cellular phone is taken as an example of a mobile terminal.

Figure 1:
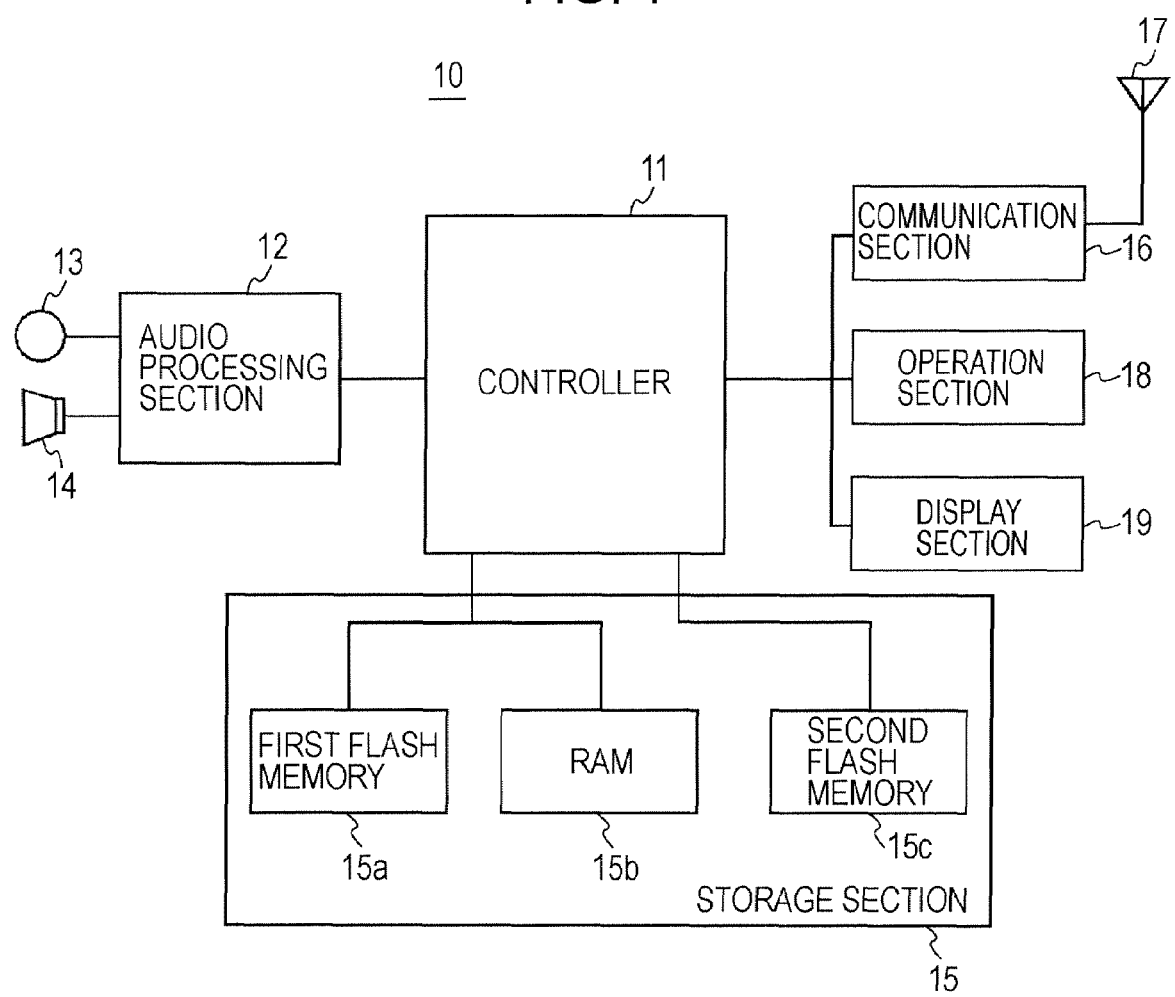
FIG. 1 is a diagram illustrating the schematic hardware configuration of a cellular phone according to an embodiment of the present invention.

FIG. 1 illustrates the general hardware configuration of a cellular phone according to the embodiment of the present invention. A cellular phone 10 includes a control section 11, an audio processing section 12, a microphone 13, a speaker 14, a storage section 15, a communication section 16, an antenna 17, an operation section 18, and a display section 19.

The control section 11 has processors, such as a CPU (Central Processing Unit), a DSP (Digital Signal Processor), etc., and controls each section of the cellular phones 10. The audio processing section 12 performs audio processing, such as telephone conversation, music playback, etc., under the control of the control section 11, receives audio input from the microphone 13, and produces audio output to the speaker 14. The storage section 15 is a section for storing programs and data, and has a first flash memory 15a, a RAM 15b, and a second flash memory 15c. The first flash memory 15a is a rewritable nonvolatile memory for storing programs executed by the control section 11. Here, a NOR-type flash memory is used as the first flash memory 15a. The RAM 15b is a memory for temporarily storing programs and data and being used by the control section 11. In the present embodiment, as described below, when the programs in the first flash memory 15a are updated, an update program in the first flash memory 15a is copied to the RAM 15b and is executed there. The second flash memory 15c is a rewritable nonvolatile memory for storing various data, such as telephone directories, e-mails, the Web contents, music, images, etc. Here, a NAND-type flash memory is used as the second flash memory 15c. In the present embodiment, the update files are downloaded into the second flash memory 15c.

The communication section 16 is a part for performing radio transmission and receiving to and from a base station (not shown in the figure) through the antenna 17 under the control of the control section 11. The operation section 18 has numeric keys, various control keys, a jog dial, etc., and has a function of inputting an instruction and information from the user into the control section 11. The display section 19 has a display device, for example, a liquid crystal display, an organic EL (Electro Luminescence) display, etc., and has a function of displaying visual information, such as texts, images (still images and moving images), etc.

Figure 2:
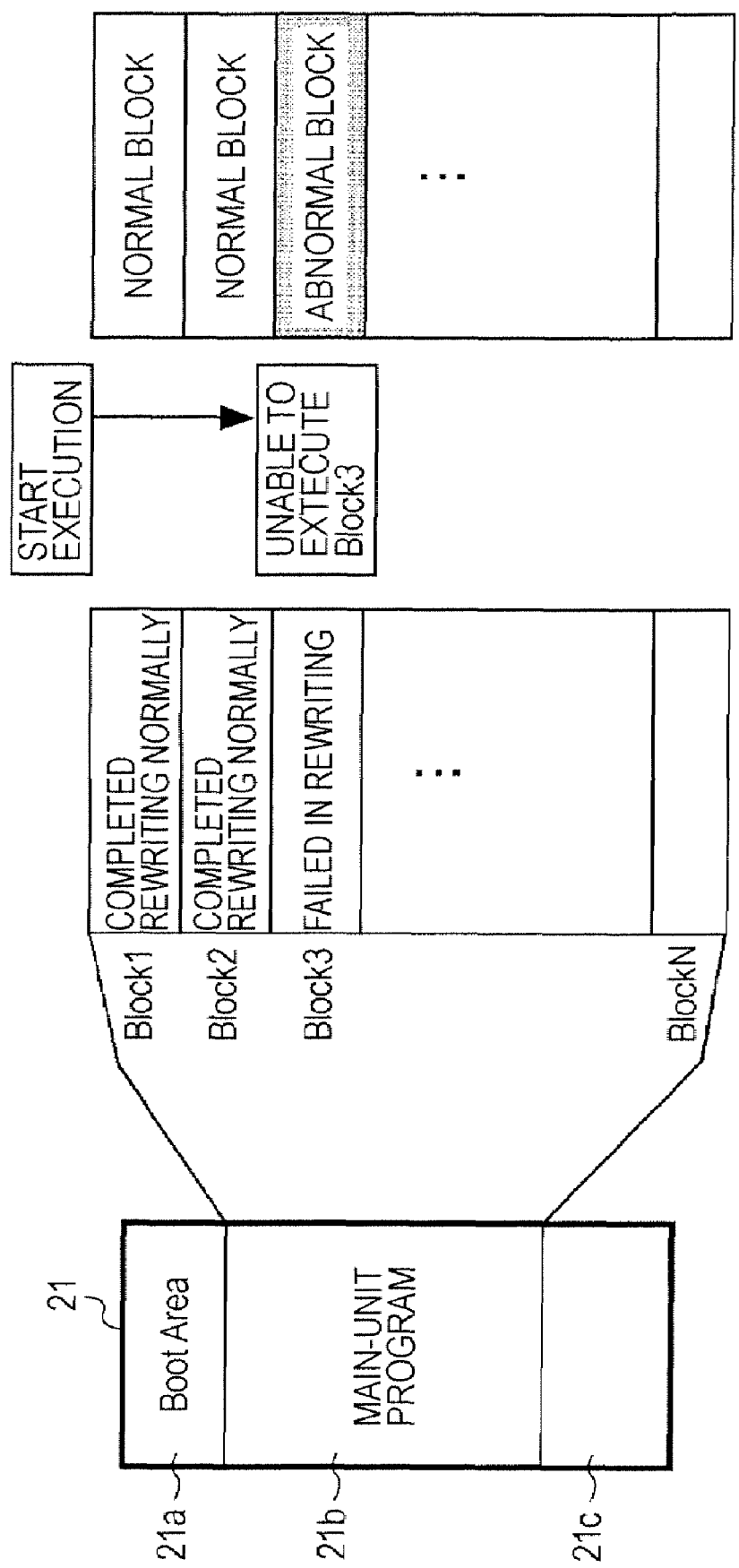
FIG. 2 is a diagram illustrating the configuration of a first flash memory shown in FIG. 1.

FIG. 2 illustrates the configuration of the first flash memory 15a. The program to be installed in the cellular phone is stored in the first flash memory 15a. A boot area 21a having the beginning memory address in a memory space 21 to which the first flash memory 15a is allocated stores the code, called "boot", to be processed at the time of turning on the power (at starting time). Also, an area 21b subsequent to the boot area 21a stores a main-unit program. The first flash memory 15a may include a reserved area 21c subsequent to the area 21b (Note that although the area is not particularly shown in the following figures, this is the same for those figures). Normally, the processing proceeds from the boot processing to the main-unit processing to start the operation of the cellular phone. In the software update, part of the main-unit program is to be updated (rewritten). In the present embodiment, the "main-unit program" means programs stored in the internal memory of the cellular phone in advance before shipment.

Also, the main-unit program is rewritten for each block at software update time. At that time, if a phenomenon such as a defective device or a failure occurs in writing to some block, the main-unit program itself includes a block in the middle of the update, and thus the main-unit program goes to an inexecutable state. For example, the example in FIG. 2 shows the case where the update processing has normally completed in the block1 and the block2, whereas in the block3, the update processing has failed. At this time, the main-unit program runs out of control during the execution of the block3.

Figure 3:
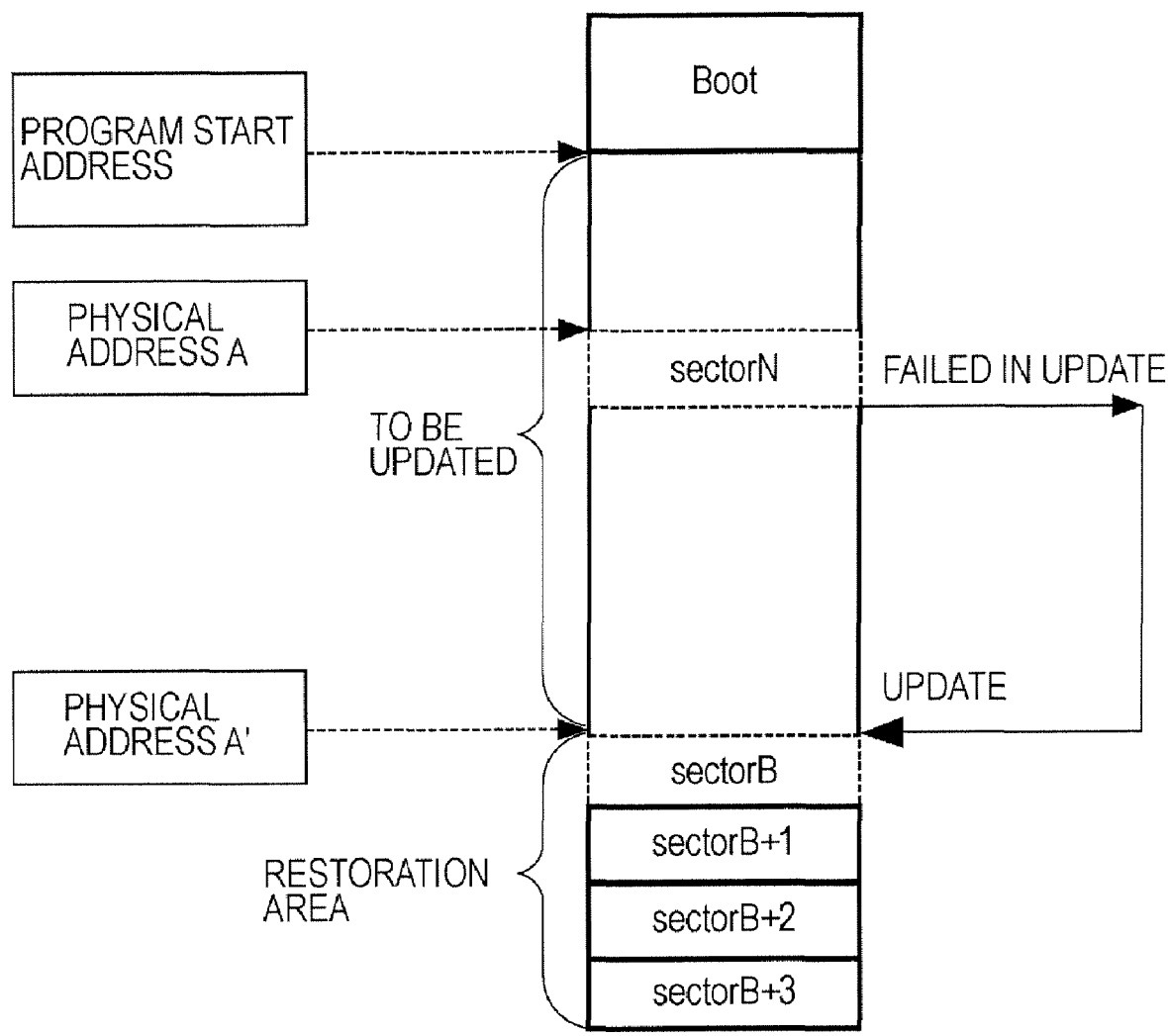
FIG. 3 is a diagram illustrating the configuration of a memory for performing restoration operation at the time of update failure in the embodiment of the present invention.

In the following, a description will be given of the restoration operation in the present embodiment. In order to ensure the two memories described above, a large-capacity memory becomes necessary, and thus it is disadvantageous in cost. Thus, the present applicant proposes a method of realizing a restoration operation at the time of failing in the software update with a minimum memory configuration without having two program areas. A description will be given of the memory configuration for that purpose using the memory space 21 in FIG. 3. In FIG. 3, a memory area for restoration is ensured in addition to a memory area to be updated. This memory area is not to be updated, and if the update has not failed, or the like, this memory area is not used for updating the software.

Figure 4:
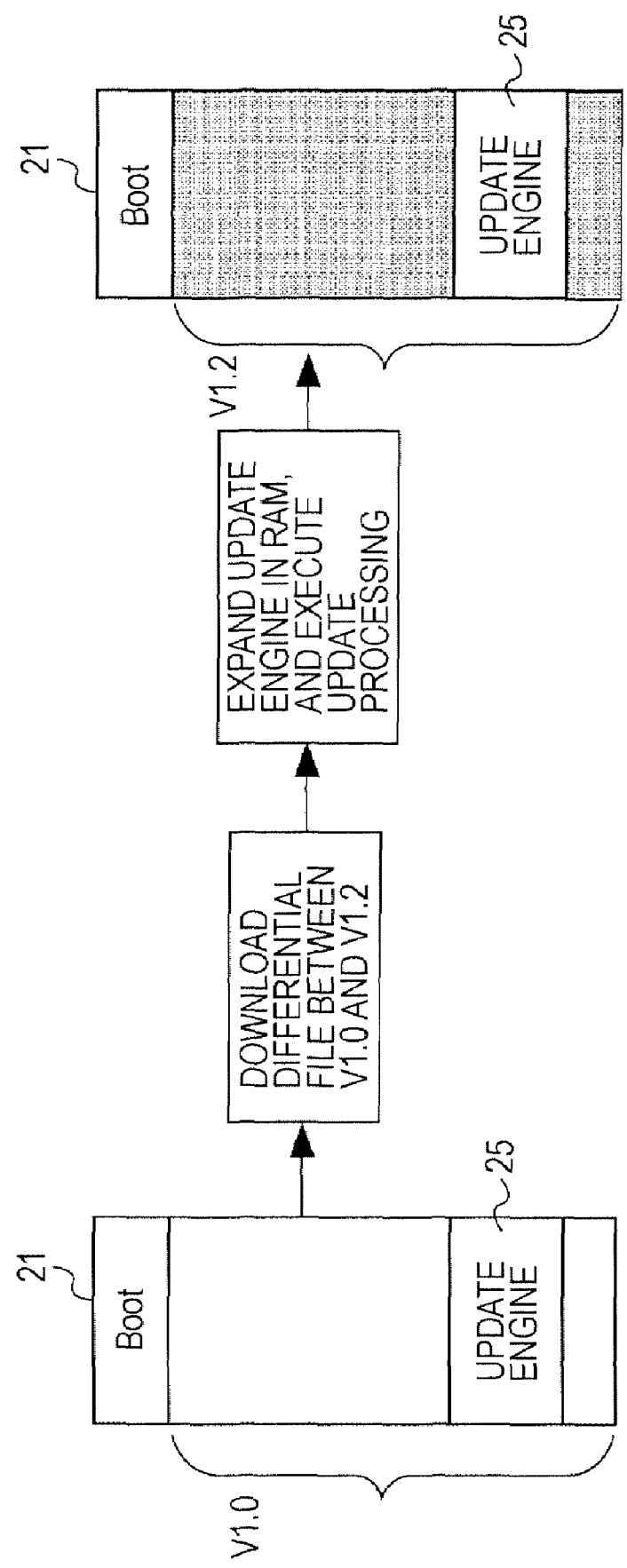
FIG. 4 is a diagram illustrating the software-update engine in the embodiment of the present invention.

As shown in FIG. 4, a software update engine 25 is installed as a part of the main-unit program. That is to say, the software update engine 25, which is the update software as a part of the main-unit program in the flash memory, is once expanded (copied) in the RAM 15b before the software update, and the software update is carried out by executing the software update engine 25 in an area in the RAM. For example, when the update from the version V1.0 to the version V1.2 is executed, the differential file between V1.0 and V1.2 is downloaded into the second flash memory 15c, the update engine 25 is expanded in the RAM 15b, and the software update is executed by starting the update engine. In this regard, it is possible to define which area in the memory is to be updated by the update engine 25.

If the update fails in SectorN in the area to be updated because of a memory defect, etc., the target of the update is changed to the address (physical address A') of the SectorB in the restoration area, and the update processing is continued.

In the NOR-type flash memory used as the first flash memory in the present embodiment, the software update (writing in the memory) is carried out for each sector as a unit area, and thus it is possible to take measures against update failure by providing a sector area (for example, 64 Kbytes) as a restoration area.

In the example shown in FIG. 3, four restoration areas (four sectors) are ensured. In this state, the update processing is normally completed if the number of defective sectors is up to four. However, the number of restoration areas is not limited to four, and the present invention can be carried out if there is at least one restoration area.

Figure 5:
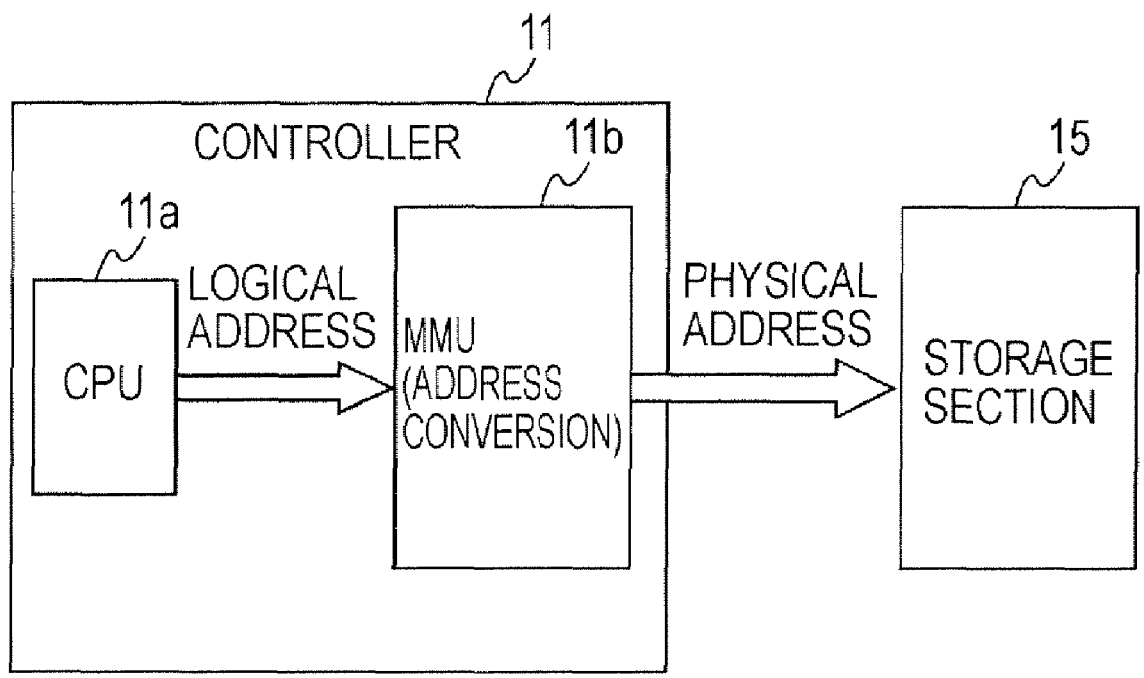
FIG. 5 is a diagram illustrating a memory management unit (MMU) used in the embodiment of the present invention.

In the configuration of FIG. 3, even if there is a defect in the memory area of the main-unit software, it is possible to update the software normally using the restoration area. However, the actual program is executed from the program start address, and thus the software having a different physical address may be impossible to be normally started. In order to make this possible, a conversion function from a physical address to a logical address, which is disposed in the control section 11, is used. That is to say, a physical address A, which has become unavailable by a failure in updating the sector, is used as a logical address, and this address is converted into a physical address A1. This operation is possible by the settings of a memory management unit (MMU) 11b in the control section 11 as shown in FIG. 5. As a result, if the main-unit program is stored across discontinuous physical addresses, the processor sees it as a continuous address.

Figure 6:
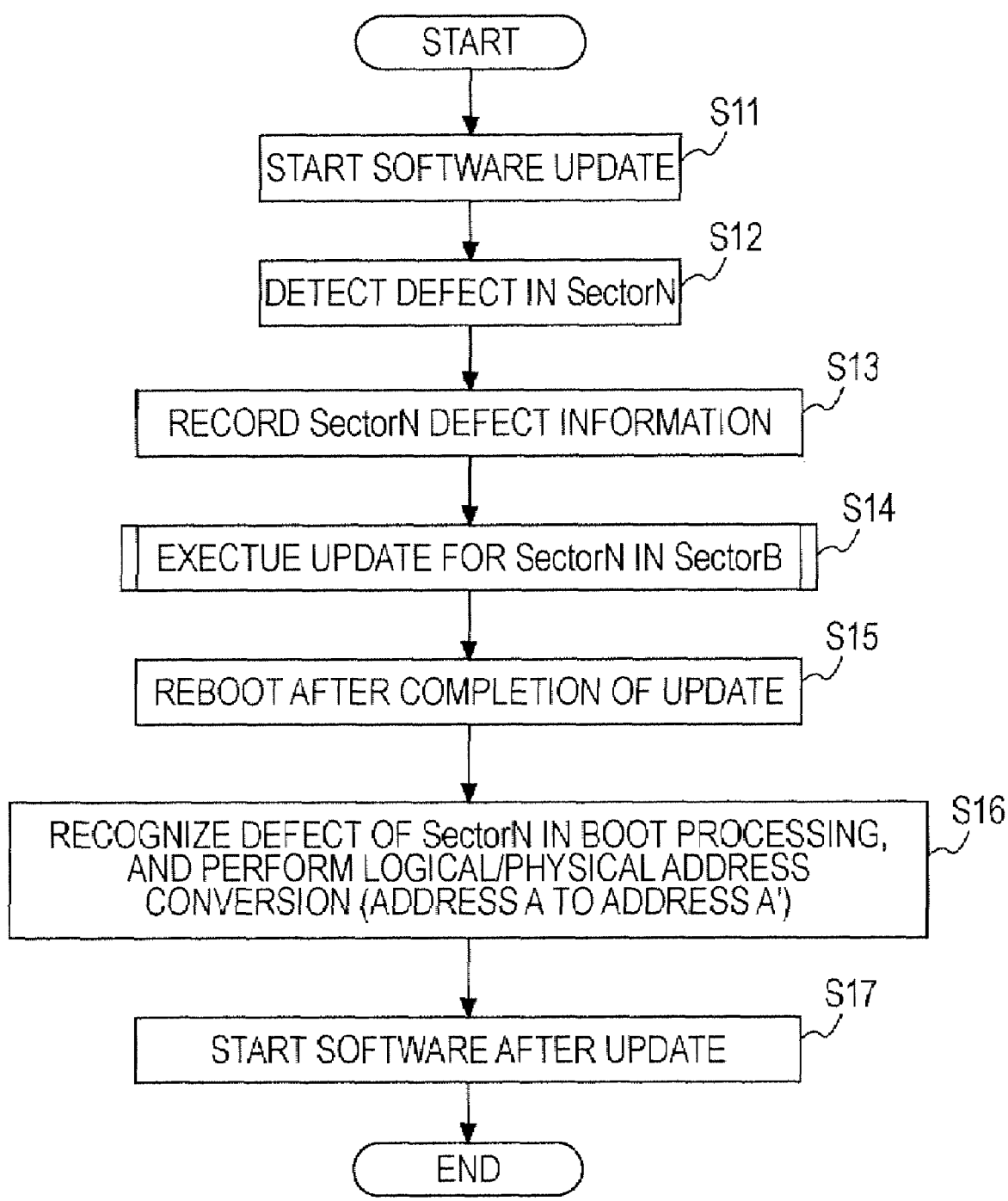
FIG. 6 is a flowchart illustrating the general processing procedure at the time of software update in the embodiment of the present invention.

FIG. 6 is a flowchart illustrating the general processing procedure at the time of software update in the present embodiment.

The software update is started (S11), and if the update has failed because of a defective memory, etc., in the sectorN (physical address A) of the area to be updated (S12), the sectorN defective information is recorded (S13). Next, the update on the sectorN is executed on the sectorB (physical address A') (S14). After the update is completed, the reboot processing is executed (S15). In the reboot processing, when a defect in sectorN is recognized on the basis of the recorded defective information, the setting of the logical/physical address conversion is performed so as to convert the address A into address A' (S16). Then, the updated software is started (S17).

In this regard, the software update is initiated by a notification of the software update from a communication common carrier to a cellular phone, or when a reply of having a software update is made by the user's operation from a cellular phone to a communication common carrier to an inquiry. In the former case, the software update processing is started automatically or on the condition that the user's confirmation is obtained. Also, in the latter case, the software update processing is started in accordance with the user's instruction.

Figure 7:
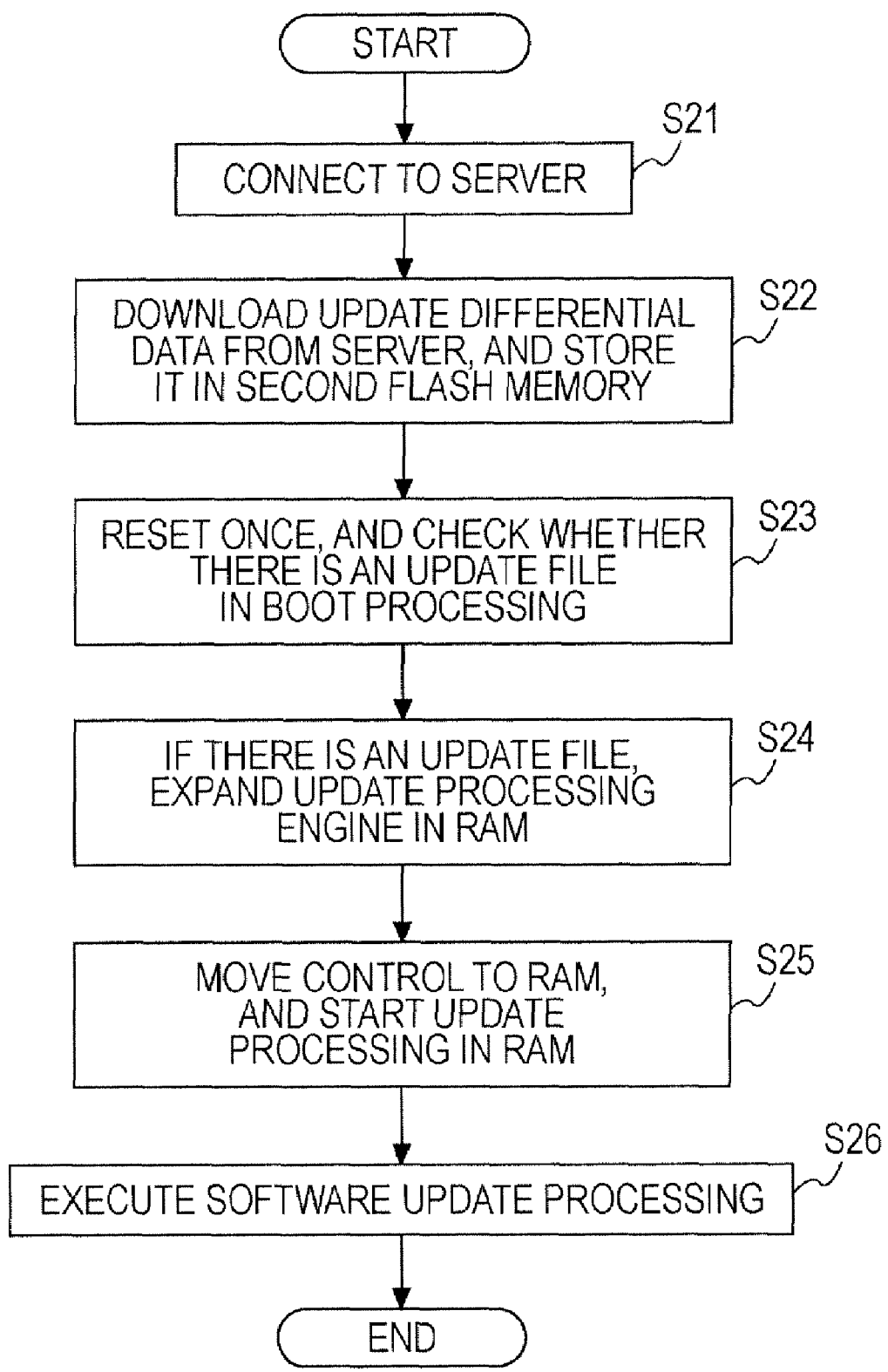
FIG. 7 is a flowchart illustrating the processing procedure executed in step S14 in FIG. 6 at the time of software update in the embodiment of the present invention.

FIG. 7 illustrates the processing procedure executed in step S14 in FIG. 6 at the time of the software update in the present embodiment.

First, the cellular phone is connected to a server on a predetermined network by the communication section 16 (S21). Next, update differential data is downloaded from this server (S22). In this case, the version information of the main-unit program currently stored in the cellular phone is sent to the server, and the differential data with the update target version is identified from this version information.

When the download is completed, the cellular phone is reset once, and then the boot processing confirms whether there is an update file (the above-described differential data) (S23). This confirmation can be carried out by checking whether there is an update file itself, setting and checking the flag, etc.

If there is an update file, the update engine 25 in the main-unit program in the first flash memory 15a is expanded into the RAM 15b (S24). Then, the control is moved from the main-unit program to the update-processing engine in the RAM 15b, and the update processing is started in the RAM (S25) to perform the software update processing (S26).

The main-unit program is subjected to a version upgrade every time it becomes necessary to modify problems, etc. In the present embodiment, only a differential file for updating software is placed in the server. In this manner, the size of the file to be downloaded becomes small by executing the update of the differential file. As a result, it needs only a short time to download and update the software. For example, as a rough estimate, it becomes possible to update a main-unit program of 32 Mbytes using a differential file of about 512 Kbytes.

Here, for example, it is assumed that the main-unit program has been subjected to version upgrades from V1.0 to V1.1, and then further to V1.2. In this case, the following three files are placed in the sever.
A differential file from V1.0 to V1.1 (1)
A differential file from V1.0 to V1.2 (2)
A differential file from V1.1 to V1.2 (3)

When the software version of the cellular phone at shipment time is V1.0 and the version of the main-unit program held in the cellular phone is also V1.0, it is necessary to download the differential file (3) to the cellular phone in order to upgrade to V1.2, which is the latest software.

Next, consider the case where the software V1.3 is released. In this case, the following files are placed in the sever.
A differential file from V1.0 to V1.1 (1)
A differential file from V1.0 to V1.2 (2)
A differential file from V1.1 to V1.2 (3)
A differential file from V1.0 to V1.3 (4)
A differential file from V1.1 to V1.3 (5)
A differential file from V1.2 to V1.3 (6)

At this time, when software is updated, the cellular phone downloads the differential file from the version of the main-unit program currently held to the latest version (for example, the differential file from V1.2 to V1.3 (6)), and executes updating the software.

In this regard, only the software update processing is executed during the execution of the rewriting, and thus all the telephone functions become unavailable until the completion of the software update. The updating time depends on the volume of the differential data, and normally takes two to five minutes. During that time period, receiving a call and making a call becomes unavailable at all, and thus the user might lose opportunity.

However, although it is necessary for the main-unit memory of a cellular phone to have a relatively large capacity, in order to have only a telephone function, the memory capacity becomes not so large. Currently the main-unit memory of a cellular phone is about 32 Mbytes. However, in order to achieve a basic function of a telephone, it is possible to achieve the function with a capacity of about 1 Mbytes. Thus, the operation of the basic telephone function becomes possible during the software update by the update engine 25 including the basic telephone function including sending and receiving a call, and thus it becomes unnecessary for the user to be conscious of the updating time. The execution of the basic telephone function during the software update is carried out by temporarily stopping the software update processing or by executing both processing in parallel by time-sharing.

Figure 8:
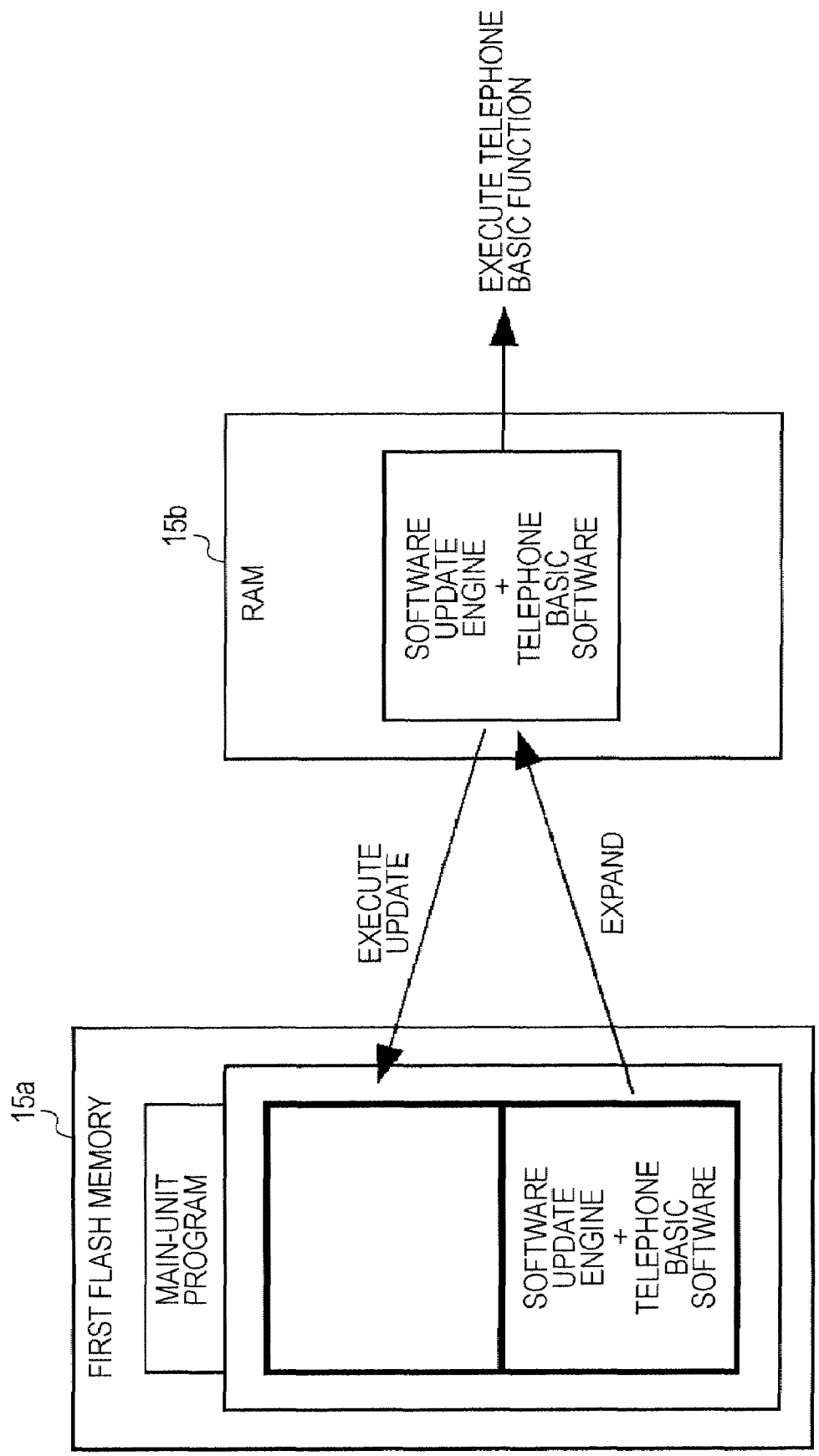
FIG. 8 is a diagram illustrating the configuration of the update engine including a basic function of a telephone in the embodiment of the present invention.

Accordingly, as shown in FIG. 8, it is possible to perform the basic function operation during the software update by installing the basic telephone function in the update engine 25. The main processing of the software update is the writing in the flash memory, and is executed along with the basic telephone function.

The following advantages are obtained by the present embodiment.
1) The communication time for downloading and update processing time become short, because the software update is performed using differential data.
2) It is possible to perform the restoration by the terminal at the time of failing in the software upgrade with a relatively small capacity of nonvolatile memory by using an alternative unit area for a unit area in the memory area which stores a main-unit program including an update engine for updating the software.
3) It is possible to use the basic telephone function during the software update by including the basic telephone function in the update engine.

In the above, a description has been given of a preferred embodiment of the present invention. However, it should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal having a communication function, comprising:
a nonvolatile memory including a memory area storing a main-unit program including an update engine for updating software and an alternative unit area for a unit area in the memory area;
a working memory; and
control means for accessing the nonvolatile memory and the working memory,
wherein the control means downloads differential data between a version of the main-unit program and a version of a new main-unit program, expands the update engine of the memory area into the working memory area, executes the update engine in the working memory area, performs update processing of the main-unit program for each unit area by the differential data, completes the update processing if the update has been successful, and performs the unit-area update processing on the alternative unit area and replaces the defective unit area by the alternative unit area if a defect of a unit area has been detected at the time of the update.

2. The mobile terminal according to claim 1, further comprising address-conversion means for converting an address of the defect-detected unit area into an address of the alternative unit area.

3. The mobile terminal according to claim 1,
wherein the update engine includes a basic telephone function including sending and receiving.

4. A method of updating software of a mobile terminal having a communication function, the method comprising the steps of:
disposing a memory area storing a main-unit program including an update engine for updating software and an alternative unit area for a unit area in the memory area in a nonvolatile memory;
downloading differential data between a version of one of the main-unit program and a version of a new main-unit program;
expanding the update engine of the memory area into a working memory area;
performing update processing of the main-unit program for each unit area by the differential data by executing the update engine in the working memory area;
completing the update processing if the update has been successful; and
performing the unit-area update processing on the alternative unit area and replaces the defective unit area by the alternative unit area if a defect of a unit area has been detected at the time of the update.

* * * * *